(12) United States Patent
Sakai

(10) Patent No.: US 9,129,195 B2
(45) Date of Patent: Sep. 8, 2015

(54) DATA TRANSMITTING AND RECEIVING DEVICE, LIQUID EJECTION APPARATUS, AND NON-TRANSITORY STORAGE MEDIUM STORING INSTRUCTIONS EXECUTABLE BY DATA TRANSMITTING AND RECEIVING DEVICE

(71) Applicant: BROTHER KOGYO KABUSHIKI KAISHA, Nagoya-shi, Aichi-ken (JP)

(72) Inventor: Katsunori Sakai, Toyokawa (JP)

(73) Assignee: BROTHER KOGYO KABUSHIKI KAISHA, Nagoya-Shi, Aichi-Ken (JP)

( * ) Notice: Subject to any disclaimer, the term of this patent is extended or adjusted under 35 U.S.C. 154(b) by 0 days.

(21) Appl. No.: 14/291,181

(22) Filed: May 30, 2014

(65) Prior Publication Data

US 2014/0355062 A1 Dec. 4, 2014

(30) Foreign Application Priority Data

May 31, 2013 (JP) .................................. 2013-115151

(51) Int. Cl.
*B41J 29/38* (2006.01)
*G06K 15/02* (2006.01)

(52) U.S. Cl.
CPC ...................... *G06K 15/02* (2013.01)

(58) Field of Classification Search
CPC ...... B41J 29/38; B41J 2/04588; B41J 11/008; B41J 2/04
See application file for complete search history.

(56) References Cited

U.S. PATENT DOCUMENTS

| 6,793,324 | B2 * | 9/2004 | Hosono et al. | 347/54 |
| 7,600,847 | B2 * | 10/2009 | Zhang | 347/19 |
| 8,011,747 | B2 * | 9/2011 | Walmsley et al. | 347/9 |

FOREIGN PATENT DOCUMENTS

| JP | 2000-0280575 A | 10/2000 |
| JP | 2009-029044 A | 2/2009 |

* cited by examiner

*Primary Examiner* — Lamson Nguyen
(74) *Attorney, Agent, or Firm* — Merchant & Gould PC

(57) ABSTRACT

A data transmitting and receiving device includes: a clock signal generator which modulates a reference clock signal having a reference frequency to produce a clock signal whose frequency changes in a set cycle within a set frequency band; and a frequency range storage which stores a first frequency range as a part of the set frequency band and/or a second frequency range as the rest part of the set frequency band. The first transmitter does not transmit first communication data to a first receiver based on the clock signal having the frequency belonging to the first frequency range and transmits the first communication data to the first receiver based on the clock signal having the frequency belonging to the second frequency range. The first receiver receives the first communication data from the first transmitter based on the clock signal having the frequency belonging to the second frequency range.

12 Claims, 10 Drawing Sheets

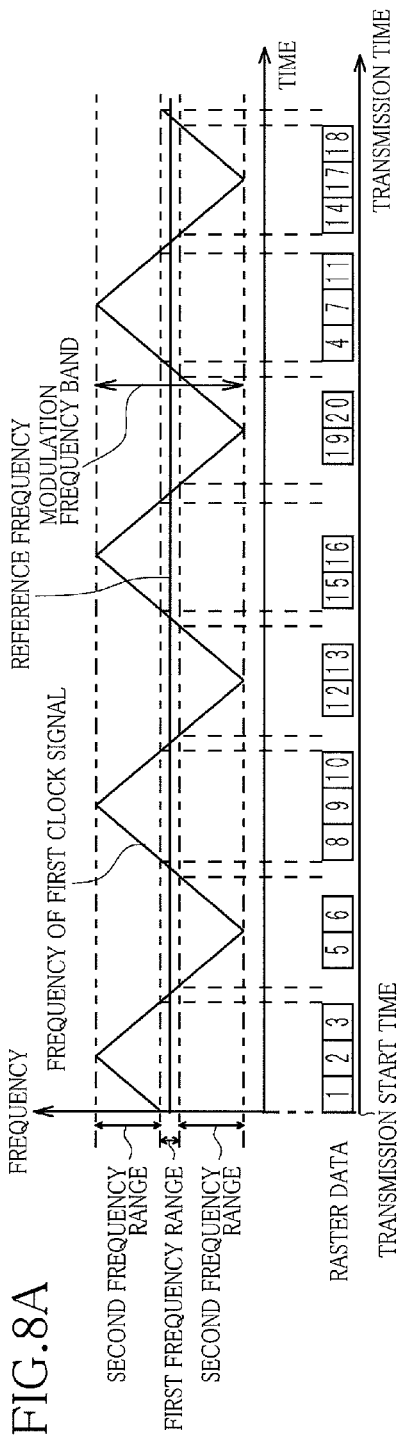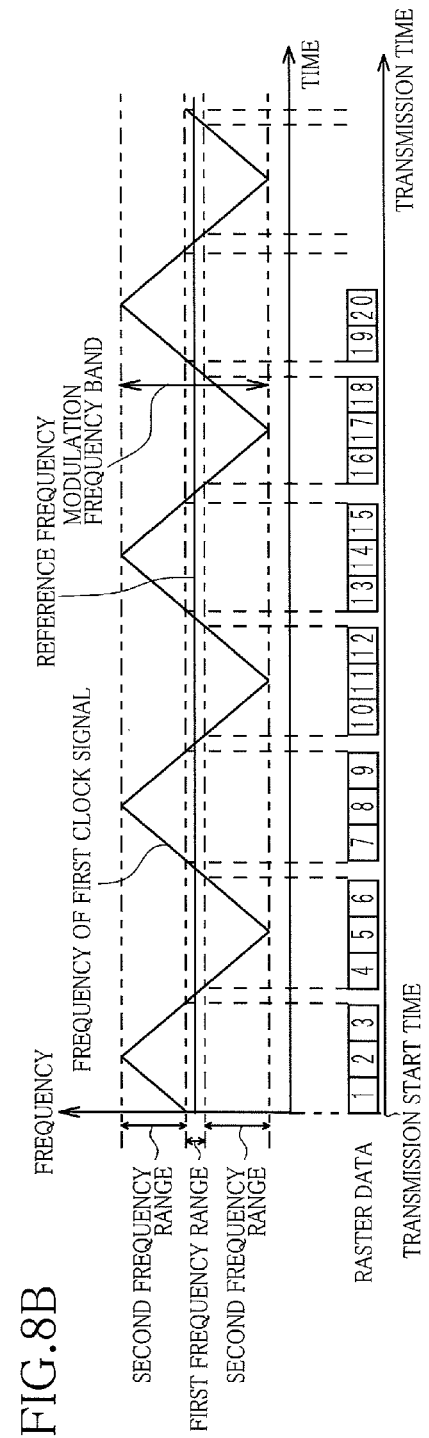

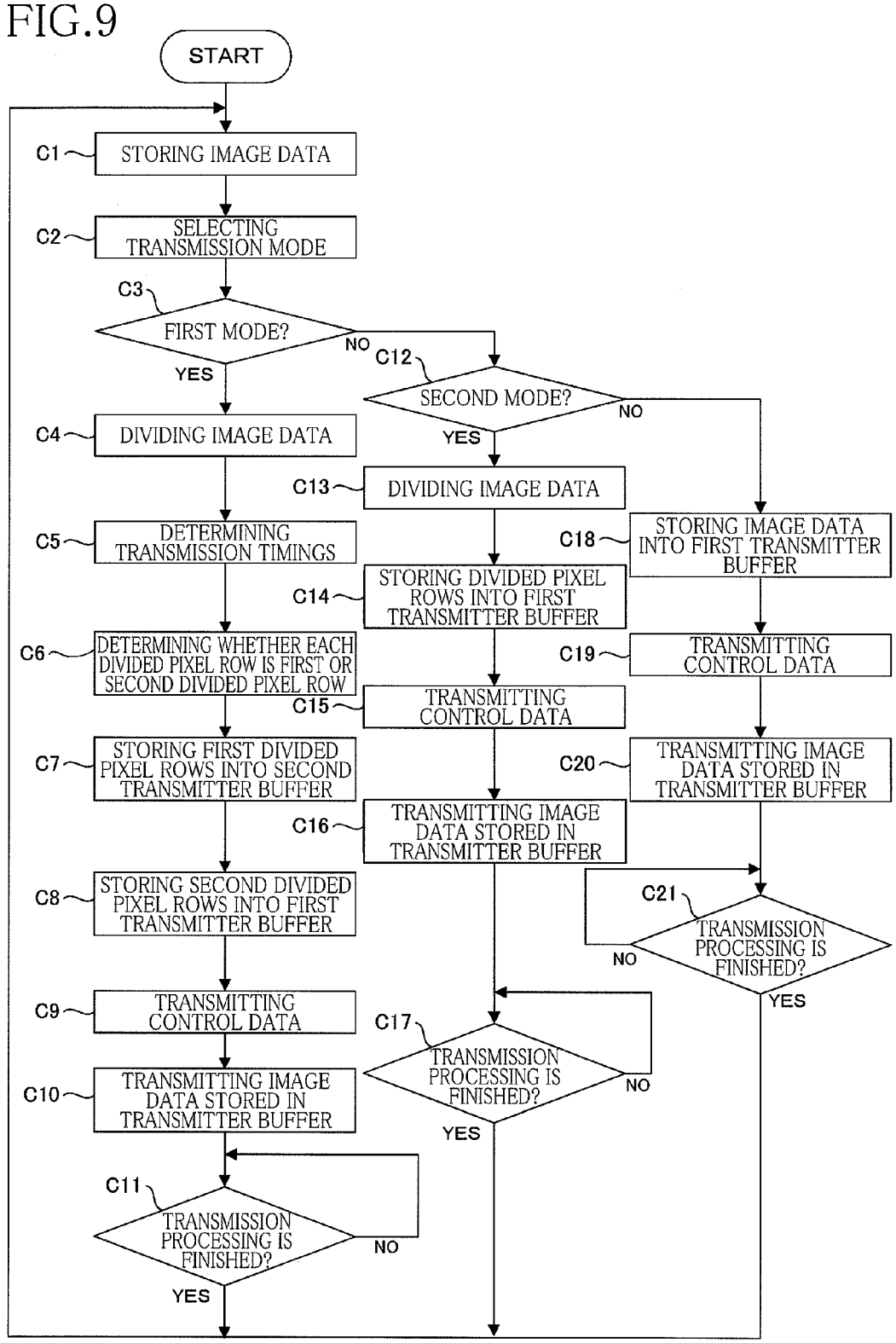

DATA TRANSMITTING AND RECEIVING DEVICE, LIQUID EJECTION APPARATUS, AND NON-TRANSITORY STORAGE MEDIUM STORING INSTRUCTIONS EXECUTABLE BY DATA TRANSMITTING AND RECEIVING DEVICE

CROSS REFERENCE TO RELATED APPLICATION

The present application claims priority from Japanese Patent Application No. 2013-115151, which was filed on May 31, 2013, the disclosure of which is herein incorporated by reference in its entirety.

BACKGROUND OF THE INVENTION

1. Field of the Invention

The present invention relates to a data transmitting and receiving device, a liquid ejection apparatus, and a non-transitory storage medium storing a plurality of instructions executable by a processor of the data transmitting and receiving device.

2. Description of the Related Art

There is known a data transmitting and receiving device which includes a transmitter and a receiver contained in a housing and is configured to transmit and receive communication data between the transmitter and the receiver. Measures against Electromagnetic Interference (EMI) are becoming increasingly important in such a data transmitting and receiving device with its higher speed and greater densities.

There is known a printer configured to output a video signal synchronized with a video clock signal, from a controller to a drawing engine. This printer reduces the peak of radiated electromagnetic noise by using, as the video clock signal, a clock signal obtained by modifying a clock frequency with a predetermined cycle by means of a spread spectrum clock generator (SSCG).

SUMMARY OF THE INVENTION

The inventor of the present invention has found that in a case where resonance has occurred in a frequency range in a frequency band obtained by modifying a clock frequency or a reference frequency, or in a case where a device contains both of a communication device configured to modify a clock frequency to carry out data communication and a communication device configured not to modify the clock frequency to carry out data communication, for example, the peak of radiated electromagnetic noise in a particular frequency range is high even if data communication is carried out on the modified clock frequency.

This invention has been developed to provide a data transmitting and receiving device configured to transmit and receive communication data between a transmitter and a receiver contained in a housing, a liquid ejection apparatus including the data transmitting and receiving device, and a non-transitory storage medium storing a plurality of instructions executable by a processor of the data transmitting and receiving device, each capable of reducing the peak of radiated electromagnetic noise in a particular frequency range.

The present invention provides a data transmitting and receiving device, including: a first communication data storage configured to store first communication data; a first transmitter configured to transmit the first communication data; a first receiver configured to receive the first communication data transmitted by the first transmitter; a housing accommodating at least the first transmitter and the first receiver; a transmission controller configured to control the first transmitter; a reception controller configured to control the first receiver; a first clock signal generator configured to modulate a reference clock signal including a reference frequency to produce a first clock signal including a frequency which changes in a set cycle within a set frequency band; and a frequency range storage configured to store at least one of a first frequency range which is a part of the set frequency band of the first clock signal and a second frequency range which is a rest part of the set frequency band except for the first frequency range. The transmission controller is configured to execute a transmission processing in which the transmission controller controls the first transmitter not to transmit the first communication data stored in the first communication data storage to the first receiver based on the first clock signal produced by the first clock signal generator and including the frequency belonging to the first frequency range of the set frequency band and controls the first transmitter to transmit the first communication data to the first receiver based on the first clock signal including the frequency belonging to the second frequency range of the set frequency band. The reception controller is configured to execute a reception processing in which the reception controller controls the first receiver to receive the first communication data from the first transmitter based on the first clock signal including the frequency belonging to the second frequency range of the first clock signal.

The present invention also provides a non-transitory storage medium storing a plurality of instructions executable by a processor of a data transmitting and receiving device. The data transmitting and receiving device includes: a communication data storage configured to store communication data; a transmitter configured to transmit the communication data; a receiver configured to receive the communication data transmitted by the transmitter; a housing accommodating at least the transmitter and the receiver; a clock signal generator configured to modulate a reference clock signal including a reference frequency to produce a clock signal including a frequency which changes in a set cycle within a set frequency band; and a frequency range storage configured to store at least one of a first frequency range which is a part of the set frequency band of the clock signal and a second frequency range which is a rest part of the set frequency band except for the first frequency range. The plurality of instructions, when executed by the processor, cause the processor to execute: a transmission processing in which the processor controls the transmitter not to transmit the communication data stored in the communication data storage to the receiver based on the clock signal produced by the clock signal generator and including the frequency belonging to the first frequency range of the set frequency band and controls the transmitter to transmit the communication data to the receiver based on the clock signal including the frequency belonging to the second frequency range of the set frequency band; and a reception processing in which the processor controls the receiver to receive the communication data from the transmitter based on the clock signal including the frequency belonging to the second frequency range of the first clock signal.

The present invention also provides a data transmitting and receiving device, including: a first communication data storage configured to store first communication data; a first transmitter configured to transmit the first communication data; a first receiver configured to receive the first communication data transmitted by the first transmitter; a housing accommodating at least the first transmitter and the first receiver; a transmission controller configured to control the first transmitter; a reception controller configured to control the first receiver; a first clock signal generator configured to modulate a reference clock signal including a reference frequency to produce a first clock signal including a frequency which changes in a set cycle within a set frequency band; and a frequency range storage configured to store at least one of a first frequency range which is a part of the set frequency band of the first clock signal and a second frequency range which is a rest part of the set frequency band except for the first frequency range. The transmission controller is configured to: determine the second frequency range based on at least one of the first frequency range and the second frequency range stored in the frequency range storage; and execute a transmission processing in which the transmission controller controls the first transmitter to transmit the first communication data to the first receiver based on the first clock signal including the frequency belonging to the second frequency range of the set frequency band. The reception controller is configured to execute a reception processing in which the reception controller controls the first receiver to receive the first communication data from the first transmitter based on the first clock signal including the frequency belonging to the second frequency range of the first clock signal.

BRIEF DESCRIPTION OF THE DRAWINGS

The objects, features, advantages, and technical and industrial significance of the present invention will be better understood by reading the following detailed description of the embodiments of the invention, when considered in connection with the accompanying drawings, in which:

FIG. 8A is a view illustrating timings of transmission of divided pixel rows of a raster data set in a second embodiment, and FIG. 8B is a view illustrating timings of transmission of divided pixel rows of a raster data set in a third embodiment;

FIG. 9 is a flow chart illustrating processings to be executed by a CPU in a fourth embodiment.

DETAILED DESCRIPTION OF THE EMBODIMENTS

First Embodiment

Figure 1:
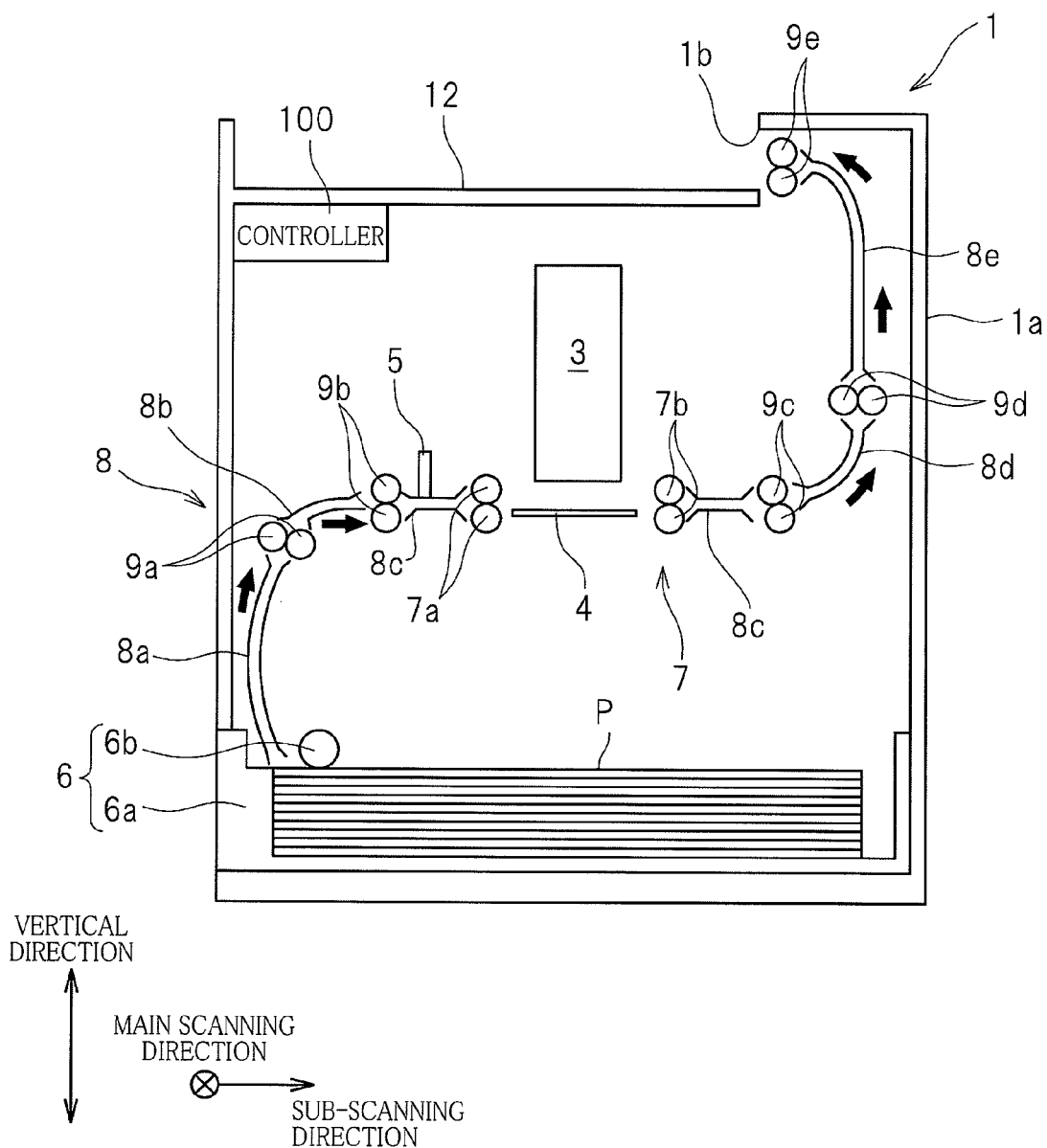
FIG. 1 is a schematic side view of an ink jet printer according to a first embodiment of the present invention.

Hereinafter, there will be explained an ink jet printer 1 according to a first embodiment of the present invention by reference to the drawings. As illustrated in FIG. 1, the printer 1 includes a housing 1a having a rectangular parallelepiped shape. A sheet-output tray 12 is provided at a top portion of the housing 1a. Devices and components accommodated in the interior of the housing 1a include an inkjet head 3 as one example of a liquid ejection head, a platen 4, a sheet sensor 5, a sheet-supply unit 6, a conveyor unit 7 as one example of a moving mechanism, a guide unit 8, and a controller 100 as one example of a data transmitting and receiving device. The interior of the housing 1a has a conveyance path through which a recording medium in the form of a sheet P is conveyed from the sheet-supply unit 6 to the sheet-output tray 12 along bold arrows illustrated in FIG. 1.

Figure 2A:
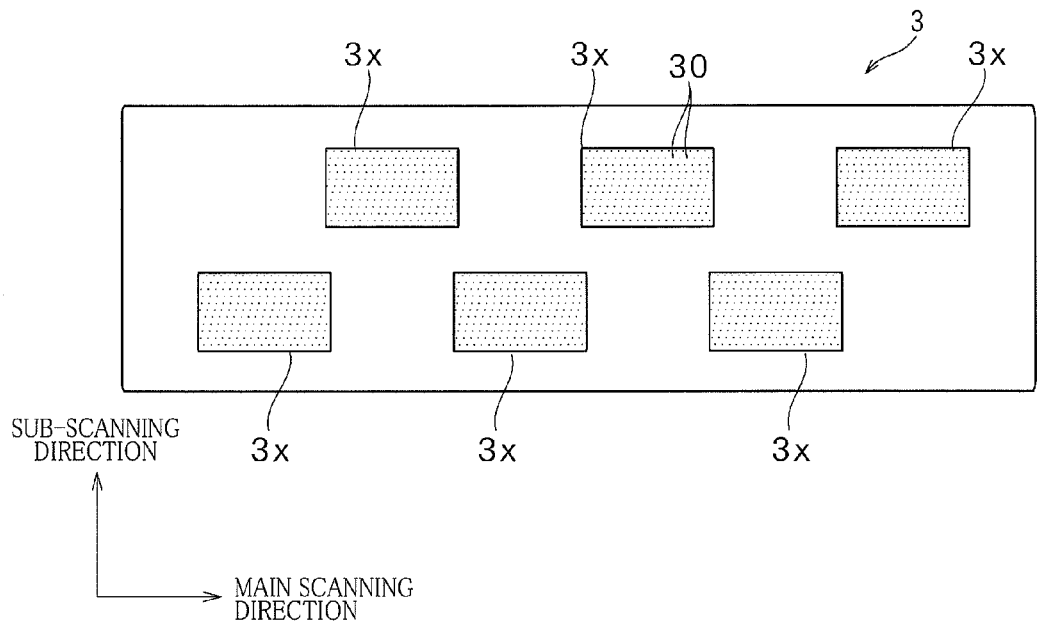
FIG. 2A is a plan view of an ink-jet head.

The head 3 is a line head fixed to a predetermined position and has generally a rectangular parallelepiped shape elongated in a main scanning direction. The head 3 includes six head units 3x spaced apart from each other so as to be arranged in a staggered configuration in the main scanning direction (see FIG. 2A). The construction of the head 3 will be explained later in detail. Here, in the present embodiment, a sub-scanning direction is a direction parallel to a horizontal direction and parallel to a sheet conveying direction in which the sheet P is conveyed by the conveyor unit 7 in FIG. 1. The main scanning direction is a direction parallel to a horizontal plane in FIG. 1 and perpendicular to the sub-scanning direction.

The platen 4 is a planar plate member opposed to the six head units 3x in a vertical direction. A space appropriate for image recording or image forming is defined between an upper surface of the platen 4 and lower surfaces of the respective head units 3x.

The sheet sensor 5 is disposed upstream of the head 3 in the sheet conveying direction. The sheet sensor 5 senses a leading edge of the sheet P to transmit a sense signal to the controller 100.

The sheet-supply unit 6 includes a sheet-supply tray 6a and a sheet-supply roller 6b. The sheet-supply tray 6a is a box opening upward and capable of storing a plurality of sheets P. Under control of the controller 100, the sheet-supply roller 6b is rotated by a sheet-supply motor 6M (see FIG. 3) to supply an uppermost one of the sheets P stored in the sheet-supply tray 6a.

The conveyor unit 7 includes conveyor roller pairs 7a, 7b disposed on opposite sides of the platen 4 in the sheet conveying direction. These conveyor roller pairs 7a, 7b are rotated by a conveyor motor 7M (see FIG. 3) under control of the controller 100.

The guide unit 8 includes an upstream guide portion and a downstream guide portion disposed on opposite sides of the conveyor unit 7 in the sheet conveying direction. The upstream guide portion includes three guides 8a, 8b, 8c and two conveyor roller pairs 9a, 9b. The upstream guide portion connects the sheet-supply unit 6 and the conveyor unit 7 to each other. The downstream guide portion includes three guides 8d, 8e, 8f and three conveyor roller pairs 9c, 9d, 9e. The downstream guide portion connects the conveyor unit 7 and the sheet-output tray 12 to each other. The conveyor roller pairs 9a-9e are rotated by a conveyance motor 9M (see FIG. 3) under control of the controller 100. Each of the guides 8a-8f is constituted by a pair of opposed plates.

Under control of the controller 100, the sheet P supplied from the sheet-supply unit 6 is conveyed to the conveyor unit 7 through positions between the plates of the guides 8a-8c while nipped by the conveyor roller pairs 9a, 9b of the upstream guide portion of the guide unit 8. The sheet P conveyed to the conveyor unit 7 is conveyed to an area opposed to a lower face of the head 3 while nipped by the conveyor roller pairs 7a, 7b of the conveyor unit 7. When the sheet P is conveyed through positions just under the head units 3x, the controller 100 controls the head 3 to eject black ink from ejection openings 30 thereof (see FIG. 2A) onto a surface of the sheet P. The sheet P on which an image is recorded is conveyed through positions between the plates of the guides 8d-8f while nipped by the conveyor roller pairs 9c-9e of the downstream guide portion of the guide unit 8 and then discharged onto the sheet-output tray 12 from an opening 1b formed in an upper portion of the housing 1a.

Figure 2B:
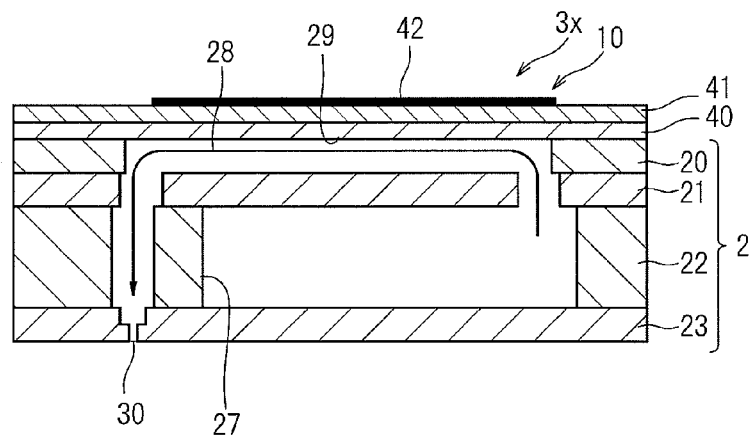
FIG. 2B is a partial cross-sectional view illustrating an individual passage of a head unit.

There will be next explained the construction of the head 3 in detail with reference to FIG. 2. The six head units 3x of the head 3 are similar in construction to each other and each includes a passage unit 2, an actuator unit 10, and a driver IC 47 (see FIG. 3). As illustrated in FIG. 2B, the passage unit 2 is constituted by four rectangular metal plates 20, 21, 22, 23 stacked on one another and each having generally the same size. This passage unit 2 has ink passages each including one manifold passage 27 and a multiplicity of individual passages 28 branched off from the manifold passage 27. The individual passages 28 are formed for the respective the ejection openings 30, for each of which the individual passage 28 extends from an outlet of the manifold passage 27 to the ejection opening 30 via a pressure chamber 29. The ejection openings 30 are open in a lower face of the passage unit 2, and the pressure chambers 29 are open in an upper face of the passage unit 2. The black ink supplied from a cartridge, not shown, to the manifold passage 27 is transferred through the individual passages 28 and ejected from the respective ejection openings 30.

The actuator unit 10 includes a vibration plate 40, a piezoelectric layer 41, and a plurality of individual electrodes 42. The vibration plate 40 is fixed to the upper face of the passage unit 2 so as to cover the plurality of pressure chambers 29. The piezoelectric layer 41 is fixed to an upper face of the vibration plate 40 so as to be opposed to the plurality of pressure chambers 29. The individual electrodes 42 are fixed to an upper face of the piezoelectric layer 41 so as to be opposed to the respective pressure chambers 29. The vibration plate 40 is a rectangular plate formed of a conductive material such as metal. The piezoelectric layer 41 is formed of a piezoelectric material and polarized in its thickness direction. The upper face of the vibration plate 40 is disposed under the lower face of the piezoelectric layer 41 so as to serve as a common electrode. The vibration plate 40 as the common electrode is connected to a ground wiring of the driver IC 47 and always kept at ground potential.

Predetermined driving electric potentials are selectively applied from the driver IC 47 to the individual electrodes 42, causing a potential difference between the individual electrodes 42 and the vibration plate 40, so that an electric field in the thickness direction of the passage unit 2 acts on portions of the piezoelectric layer 41 which are opposed to the respective individual electrodes 42. Since a direction of this electric field is parallel to a direction of polarization of the piezoelectric layer 41, each of the above-described portions of the piezoelectric layer 41 is contracted in a planar direction perpendicular to the thickness direction. With this contraction, portions of the vibration plate 40 and the piezoelectric layer 41 which are opposed to the pressure chamber 29 are deformed so as to protrude toward the pressure chamber 29 (noted that this deformation is called unimorph deformation). This deformation reduces a capacity of the pressure chamber 29 and applies a pressure or an energy to the ink stored in the pressure chamber 29, causing the ink to be ejected from the ejection opening 30 communicating with the pressure chamber 29.

The vibration plate 40 and the individual electrodes 42 of the actuator unit 10 are connected to the controller 100 via the driver IC 47. The driver IC 47 selectively applies driving electric potentials to the individual electrodes 42 provided on the corresponding head unit 3x, based on drive data received from the controller 100.

All the ejection openings 30 formed in the six head units 3x of the head 3, i.e., all the ejection openings 30 formed in the head 3, are arranged such that all projective points obtained by vertically projecting these ejection openings 30 on imaginary lines extending in the main scanning direction are uniformly spaced apart from each other at a resolution of 600 dpi (at a distance of about 42 μm). In an image recorded on the sheet P, accordingly, a row of dots (including non-ejected dots on which no ink is landed) arranged in the sheet conveying direction corresponds to one ejection opening 30. A plurality of such rows of dots are formed in the image recorded on the sheet P so as to be uniformly spaced apart from each other by about 42 μm.

Figure 3:
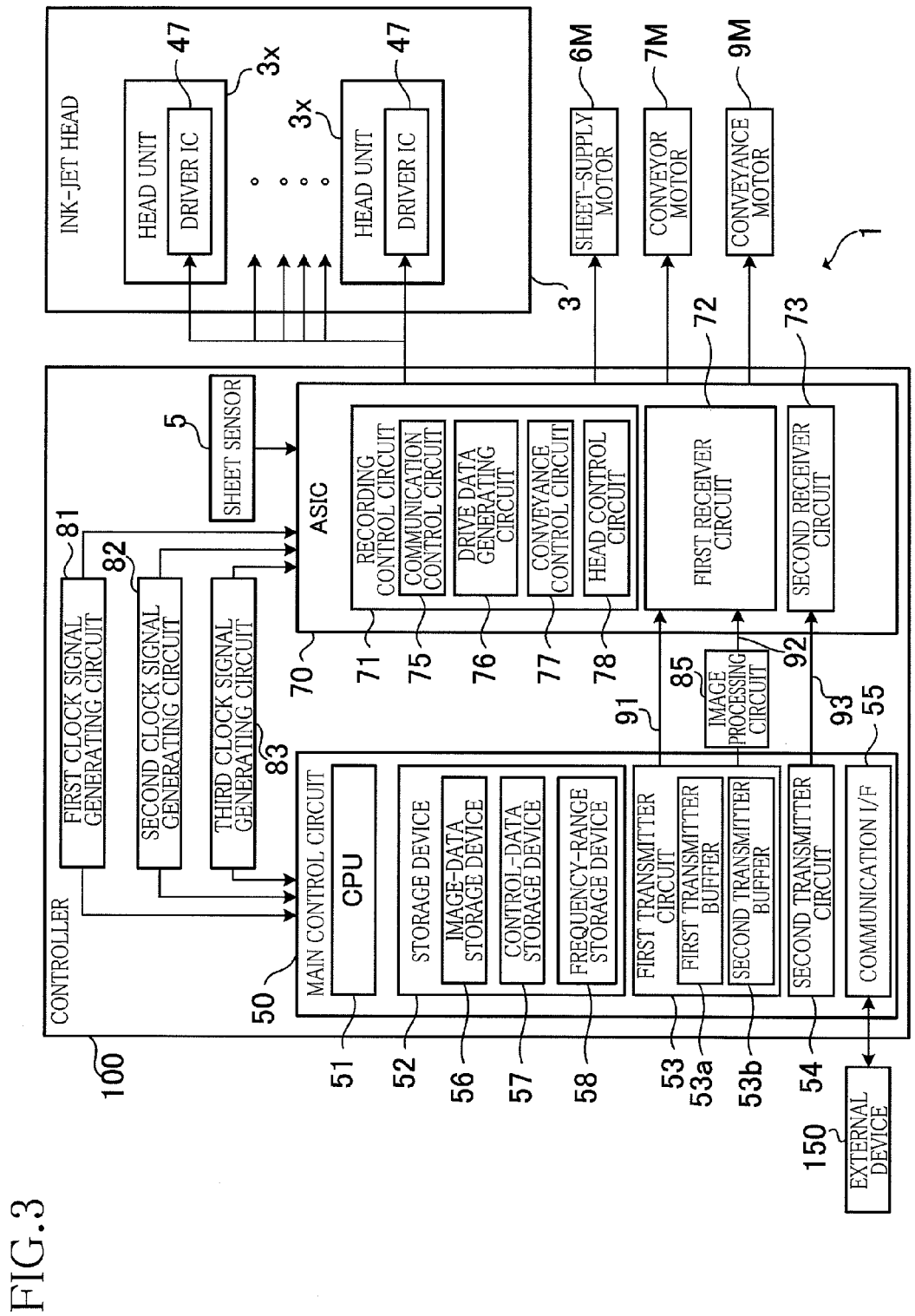
FIG. 3 is a block diagram illustrating an electric configuration of the ink jet printer illustrated in FIG. 1.

There will be next explained an electric configuration of the printer 1 with reference to FIG. 3. The controller 100 includes a main control circuit 50, an application specific integrated circuit (ASIC) 70, a first clock signal generating circuit 81, a second clock signal generating circuit 82, and a third clock signal generating circuit 83.

Figure 4A:
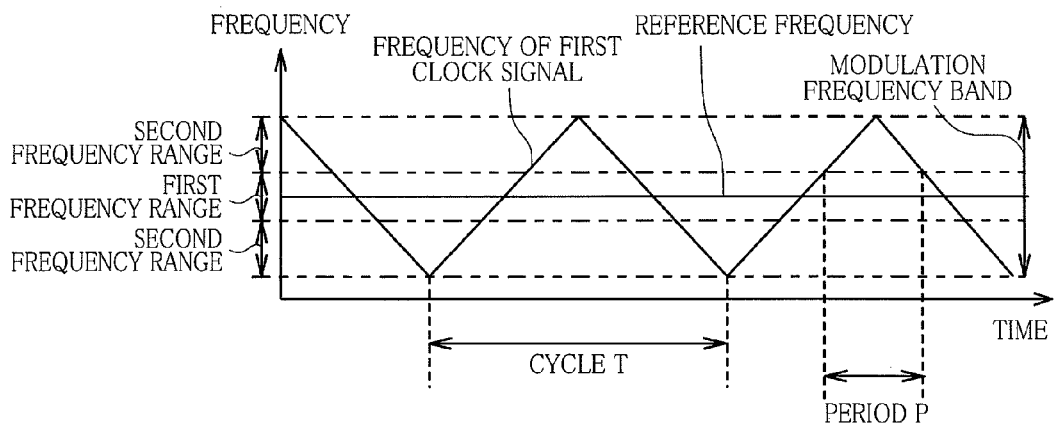
FIG. 4A is a view illustrating a relationship between a time and a frequency of a first clock signal.
Figure 4B:
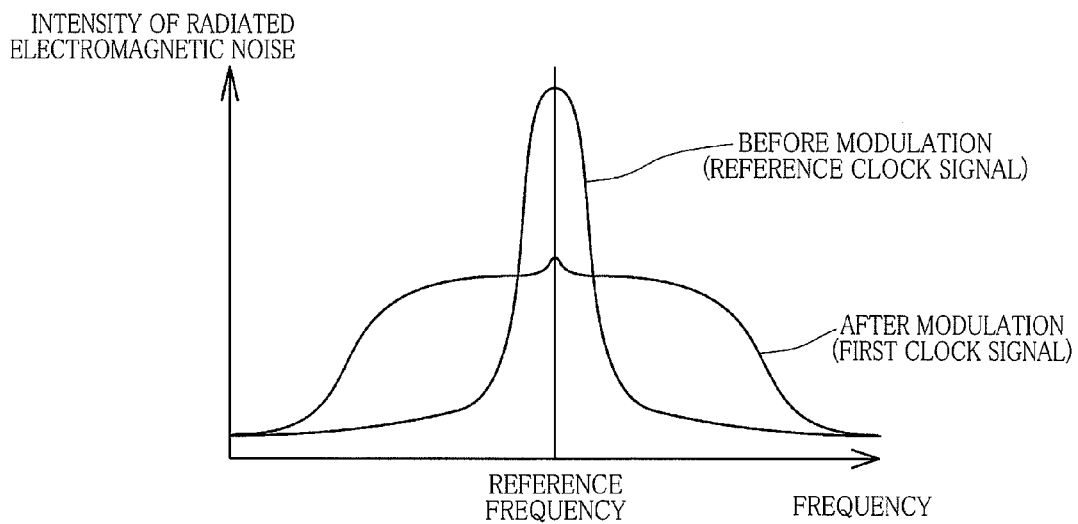
FIG. 4B is a relationship between the intensity of radiated electromagnetic noise generated in the case of a reference clock signal and the intensity of radiated electromagnetic noise generated in the case of a first clock signal.

As illustrated in FIG. 4A, the first clock signal generating circuit 81 is an SSCG circuit configured to modulate a reference clock signal having a reference frequency to produce a first clock signal whose frequency changes at a predetermined cycle T within a predetermined modulation frequency band. In the present embodiment, the first clock signal generating circuit 81 modulates the reference frequency at the cycle T in a ratio of plus or minus several percent to produce the first clock signal. As illustrated in FIG. 4B, this frequency modulation on the reference clock signal having the reference frequency can reduce the peak of radiated electromagnetic noise due to the reference clock signal. It is noted that the first clock signal generating circuit 81 is configured to set the cycle T when modulating the reference clock signal, and this cycle T is set such that each of all boundary divided pixel rows (which will be described below) contained in raster data sets is determined as a first divided pixel row in a divided data set determination processing which will be described below, for example.

The second clock signal generating circuit 82 is configured to produce a second clock signal having the above-described reference frequency (noted that this second clock signal is a reference clock signal). The third clock signal generating circuit 83 is configured to produce a third clock signal having a frequency lower than the modulation frequency band of the first clock signal (see FIG. 4A). The clock signals produced by the first clock signal generating circuit 81, the second clock signal generating circuit 82, and the third clock signal generating circuit 83 are supplied to the main control circuit 50 and the ASIC 70.

The main control circuit 50 controls the overall printer 1 and includes a central processing unit (CPU) 51 as one example of a transmission controller, a storage device 52, a first transmitter circuit 53, a second transmitter circuit 54, and a communication interface 55. The communication interface 55 carries out data communication with an external device 150.

The storage device 52 is constituted by a read only memory (ROM) for storing programs to be executed by the CPU 51, and a random access memory (RAM) used as a working area during execution of the program by the CPU 51, for example. The storage device 52 includes an image-data storage device 56, a control-data storage device 57, and a frequency-range storage device 58.

The image-data storage device 56 stores image data sets received from the external device 150 via the communication interface 55. Each of the image data sets is data in which pixels are arranged in matrix so as to correspond to an image formation area of the sheet P, and each of the pixels has 256 gray level values or density values. The image data set contains a plurality of raster data sets. Here, each of the raster data sets is a pixel row constituted by a plurality of pixels corresponding to some of the ejection openings 30 of the six head units 3x. More specifically, the raster data set is a row of pixels which respectively correspond to a plurality of dots arranged on the sheet P in the main scanning direction and which are arranged in an order of arrangement of the dots corresponding to the pixels in the main scanning direction. The plurality of raster data sets are arranged in the sub-scanning direction. It is noted that in the present embodiment, an amount of data of each raster data set contained in the image data set is larger than that of data which can be transmitted from the first transmitter circuit 53 to a first receiver circuit 72 based on the first clock signal during a period P (see FIG. 4A) extending from a point in time when a frequency range containing the frequency of the first clock signal produced by the first clock signal generating circuit 81 changes from a first frequency range to a second frequency range, to a point in time when the frequency range changes from the second frequency range to the first frequency range.

The control-data storage device 57 stores control data for controlling the ASIC 70. The frequency-range storage device 58 stores the first frequency range (see FIG. 4A) which is a part of the modulation frequency band of the first clock signal produced by the first clock signal generating circuit 81.

The first transmitter circuit 53 transmits image data sets stored in the image-data storage device 56 to the first receiver circuit 72 of the ASIC 70 which will be described below. The first transmitter circuit 53 and the first receiver circuit 72 are communicably connected to each other by a first data communication line 91 and a second data communication line 92. In the present embodiment, the first data communication line 91 is a high-speed bus offering a high-speed data transfer (for example, its transfer rate is 140 Mbps). The second data communication line 92 is a low-speed bus (for example, its transfer rate is 140 kbps). Connected to the second data communication line 92 is an image processing circuit 85 as one example of a processor configured to execute a data processing for the image data set to be transmitted from the first transmitter circuit 53 to the first receiver circuit 72 through the second data communication line 92. The image processing circuit 85 will be explained later in detail.

The first transmitter circuit 53 includes a first transmitter buffer 53a and a second transmitter buffer 53b. The first transmitter buffer 53a temporarily stores data to be transmitted to the first receiver circuit 72 through the first data communication line 91. The second transmitter buffer 53b temporarily stores data to be transmitted to the first receiver circuit 72 through the second data communication line 92.

The second transmitter circuit 54 transmits the control data stored in the control-data storage device 57 to a second receiver circuit 73 of the ASIC 70 which will be described below. The second transmitter circuit 54 and the second receiver circuit 73 are communicably connected to each other by a low-speed bus in the form of a third data communication line 93.

The ASIC 70 is a circuit configured to execute various types of processings based on the control data received from the main control circuit 50. The ASIC 70 includes a recording control circuit 71 as one example of a reception controller, the first receiver circuit 72 as one example of a first receiver, and the second receiver circuit 73 as one example of a second receiver.

The first receiver circuit 72 receives the image data set transmitted from the first transmitter circuit 53. The second receiver circuit 73 receives the control data transmitted from the second transmitter circuit 54.

The recording control circuit 71 controls the head 3, the conveyor unit 7, and other similar devices and includes a communication control circuit 75, a drive data generating circuit 76, a conveyance control circuit 77, and a head control circuit 78.

The communication control circuit 75 controls the first receiver circuit 72 and the second receiver circuit 73. The drive data generating circuit 76 executes an error diffusion processing for quantizing the image data set received by the first receiver circuit 72 into drive data with a low gray level for ink ejection. Specifically, the drive data generating circuit 76 quantizes each pixel of the image data set into two levels in a case where the head 3 can record an image with two gray levels, and the drive data generating circuit 76 quantizes each pixel of the image data set into four levels in a case where the head 3 can record an image with four gray levels.

The conveyance control circuit 77 controls the sheet-supply motor 6M, the conveyor motor 7M, and the conveyance motor 9M to convey the sheet P in the sheet conveying direction at a predetermined conveying speed.

The head control circuit 78 outputs the drive data produced by the drive data generating circuit 76 to the driver IC 47 to cause the head 3 to eject the black ink from the ejection openings 30. It is noted that the ink ejection timing is determined based on the sense of the leading edge of the sheet P by the sheet sensor 5.

Figure 5A:
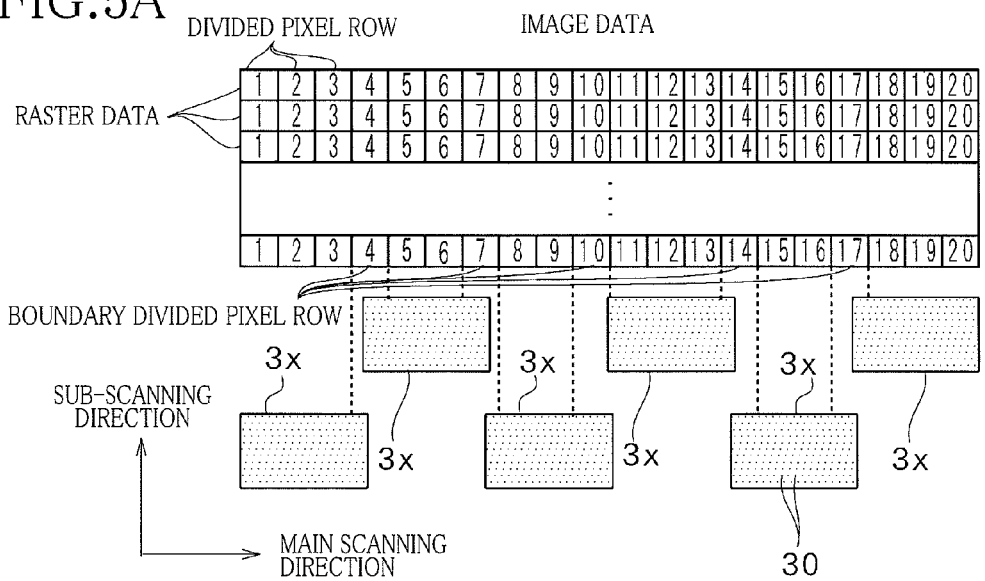
FIG. 5A is a view illustrating a correspondence between divided pixel rows of each of raster data sets contained in an image data set and ejection openings of head units.
Figure 5B:
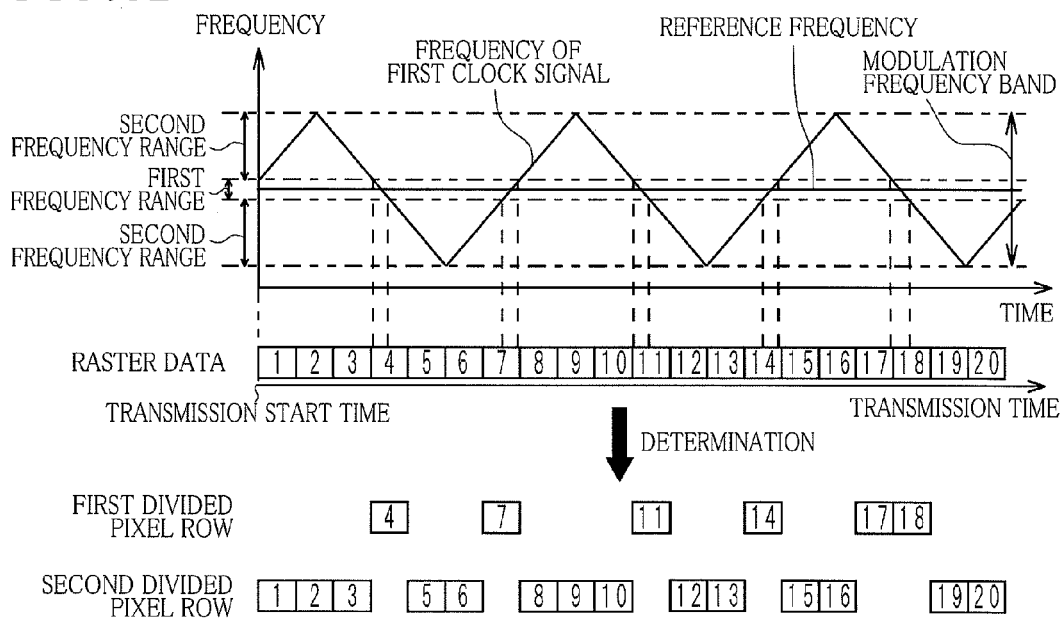
FIG. 5B is a view illustrating a correspondence between the divided pixel rows and a frequency of the first clock signal at transmissions of the divided pixel rows.
Figure 5C:
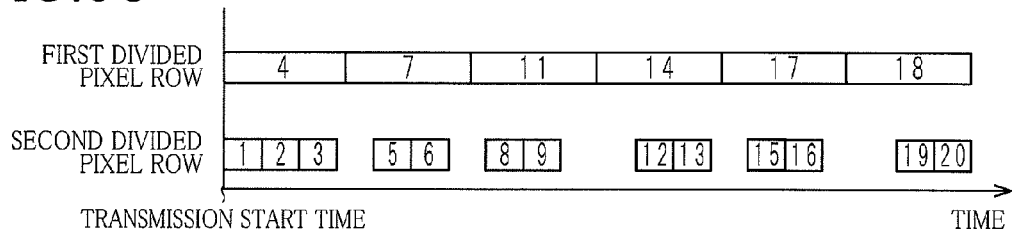
FIG. 5C is a view illustrating timings of transmission of the divided pixel rows of the raster data set.

There will be next explained, with reference to FIGS. 5A-5C, a division processing, a transmission timing determination processing, the divided data set determination processing, and a transmission processing to be executed by the CPU 51 reading the programs stored in the storage device 52. As illustrated in FIGS. 5A-5C, each raster data set contains a plurality of divided pixel rows which are numbered in ascending order from the left to the light in each figure for easier understanding.

The division processing is a processing in which the CPU 51 divides the image data set stored in the image-data storage device 56 into a plurality of divided data sets. In the present embodiment, as illustrated in FIG. 5A, the CPU 51 divides the image data set into a plurality of raster data sets and equally divides each raster data set into twenty divided pixel rows. It is noted that an amount of data of the divided pixel row is smaller than that of data which can be transmitted from the first transmitter circuit 53 to the first receiver circuit 72 based on the first clock signal during the period P (see FIG. 4A). As described above, each of the raster data sets contained in the image data set is a row of the pixels corresponding to the respective ejection openings 30 of the six head units 3x. Accordingly, the twenty divided pixel rows of each raster data set include divided pixel rows each having two pixels corresponding to the ejection openings 30 formed in different ones of the head units 3x (hereinafter such divided pixel row may be referred to as "boundary divided pixel row"). In the example illustrated in FIG. 5A, the divided pixel rows #4, #7, #10, #14, #17 are the boundary divided pixel rows. Also, the CPU 51 adds headers respectively to the divided pixel rows of each raster data set, and these headers indicate ordinal numbers of the respective divided pixel rows.

The transmission timing determination processing is a processing for determining timings of transmission of the respective divided pixel rows in a case where the CPU 51 as illustrated in FIG. 5B controls the first transmitter circuit 53 based on frequencies of the modulation frequency band of the first clock signal supplied from the first clock signal generating circuit 81, such that the divided pixel rows obtained in the division processing are sequentially transmitted to the first receiver circuit 72 through the first data communication line 91. That is, the CPU 51 determines, for each of the divided pixel rows obtained in the division processing, whether the entire divided pixel row is transmitted on a frequency belonging to the second frequency range or at least a portion of the divided pixel row is transmitted on a frequency belonging to the first frequency range, when the divided pixel rows are sequentially transmitted using the first clock signal whose frequency changes at the cycle T set by the first clock signal generating circuit 81. In the case of the raster data sets illustrated in FIG. 5B, the CPU 51 determines, for each of the divided pixel rows #1, #2, #3, for example, the entire divided pixel row is transmitted on a frequency belonging to the second frequency range. On the other hand, the CPU 51 determines, for the divided pixel row #4, for example, at least a portion of the divided pixel row is transmitted on a frequency belonging to the first frequency range.

The divided data set determination processing is a processing in which where it is assumed that the CPU 51 as illustrated in FIG. 5B controls the first transmitter circuit 53 to sequentially transmit the divided pixel rows obtained in the division processing, to the first receiver circuit 72 through the first data communication line 91 based on frequencies of the modulation frequency band of the first clock signal supplied from the first clock signal generating circuit 81, the CPU 51 determines whether each of the divided pixel rows is the first divided pixel row to be transmitted on the frequency belonging to the first frequency range stored in the frequency-range storage device 58 or a second divided pixel row to be transmitted on the frequency belonging to the second frequency range. That is, when it is determined that the entire divided pixel row of each of the plurality of divided pixel rows is to be transmitted on a frequency belonging to the second frequency range based on the timing of transmission determined in the transmission timing determination processing for each of the divided pixel rows, the CPU 51 determines that the divided pixel row is the second divided pixel row, and when it is determined that at least a portion of the divided pixel row is transmitted on a frequency belonging to the first frequency range, the CPU 51 determines that the divided pixel row is the first divided pixel row. Here, the second frequency range is the rest part of the modulation frequency band of the first clock signal other than the first frequency range.

In the present embodiment, as explained later in detail, the cycle T of the first clock signal produced by the first clock signal generating circuit 81 is set such that each of all the boundary divided pixel rows contained in the raster data set is to be determined as the first divided pixel row in the divided data set determination processing. That is, the cycle T of the first clock signal is set such that, where it is assumed that the twenty divided pixel rows of the raster data set are sequentially transmitted from the divided pixel row #1 to the first receiver circuit 72 through the first data communication line 91 based on frequencies of the modulation frequency band of the first clock signal produced by the first clock signal generating circuit 81, the frequency of the first clock signal at transmission of each boundary divided pixel row of the twenty divided pixel rows belongs to the first frequency range.

The transmission processing includes: an image data transmission processing in which the CPU 51 controls the first transmitter circuit 53 to send the ASIC 70 the image data set stored in the image-data storage device 56; and a control data transmission processing in which the CPU 51 controls the second transmitter circuit 54 to send the ASIC 70 the control data stored in the control-data storage device 57.

Figure 6A:
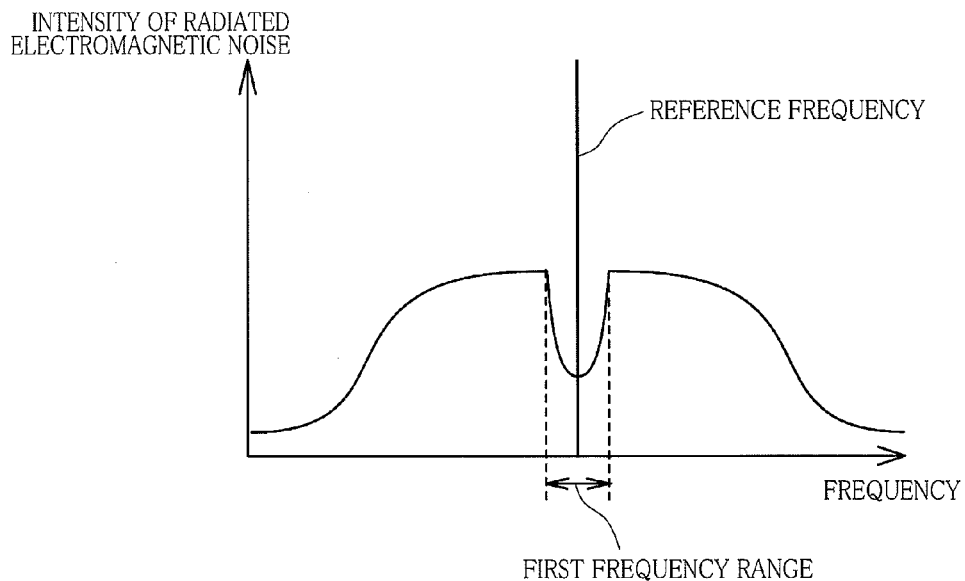
FIG. 6A is a view illustrating the intensity of radiated electromagnetic noise due to an image data transmission processing.

In the image data transmission processing, the CPU 51 stores the divided pixel rows each determined as the first divided pixel row in the divided data set determination processing, into the second transmitter buffer 53b of the first transmitter circuit 53 and stores the divided pixel rows each determined as the second divided pixel row in the divided data set determination processing, into the first transmitter buffer 53a. As illustrated in FIG. 5C, the CPU 51 controls the first transmitter circuit 53 to transmit each of the second divided pixel rows stored in the first transmitter buffer 53a, to the first receiver circuit 72 through the first data communication line 91 based on the first clock signal produced by the first clock signal generating circuit 81, at a timing of transmission determined in the transmission timing determination processing. The CPU 51 controls the first transmitter circuit 53 to transmit each of the first divided pixel rows stored in the second transmitter buffer 53b, to the first receiver circuit 72 through the second data communication line 92 based on the third clock signal produced by the third clock signal generating circuit 83. Accordingly, the transmission of the divided pixel rows from the first transmitter circuit 53 to the first receiver circuit 72 is carried out on the frequencies belonging to the second frequency range of the modulation frequency band of the first clock signal and is not carried out on frequencies belonging to the first frequency range of the modulation frequency band of the first clock signal. Therefore, as illustrated in FIG. 6A, it is possible to reduce the peak of radiated electromagnetic noise in the first frequency range due to the image data transmission processing. It is noted that since the frequency of the third clock signal is lower than that of the modulation frequency band of the first clock signal, the radiated electromagnetic noise in the first frequency range hardly increases due to the third clock signal.

In the present embodiment, as illustrated in FIG. 5C, the CPU 51 controls the first transmitter circuit 53 to transmit the first divided pixel rows successively to the first receiver circuit 72 such that a first divided pixel row to be transmitted first among the first divided pixel rows starts to be transmitted at the timing that is the same as the timing of a start of transmission of a second divided pixel row to be transmitted first among the second divided pixel rows stored in the first transmitter buffer 53a.

Incidentally, ejection characteristics of the respective six head units 3x may differ from each other due to manufacturing errors, for example. The variation of the ejection characteristics causes unevenness in density of a dot image formed on the sheet P and constituted by a plurality of dots of the ink ejected from the ejection openings 30 located near a boundary of two head units 3x adjacent to each other in the main scanning direction. In the present embodiment, the image processing circuit 85 prevents the occurrence of the unevenness in density. Specifically, as described above, the cycle T of the first clock signal produced by the first clock signal generating circuit 81 is set such that each of the boundary divided pixel rows is determined as the first divided pixel row in the divided data set determination processing. Thus, the boundary divided pixel rows are stored into the second transmitter buffer 53b and transmitted from the first transmitter circuit 53 to the first receiver circuit 72 through the second data communication line 92. The image processing circuit 85 extracts, based on the headers added to the respective divided pixel rows, the boundary divided pixel rows from the divided pixel rows to be transmitted from the first transmitter circuit 53 to the first receiver circuit 72 through the second data communication line 92 and executes an image processing for the pixels of the boundary divided pixel rows. In the present embodiment, the image processing circuit 85 executes a smoothing processing for correcting the gray level values of the pixels of the boundary divided pixel rows in accordance with the ejection characteristics of the respective head units 3x so as to smooth out the dot image formed on the sheet P by the ink ejection from the ejection openings 30 of the different head units 3x. This processing can reduce an amount of lowering of the quality of the image formed on the sheet P.

Figure 6B:
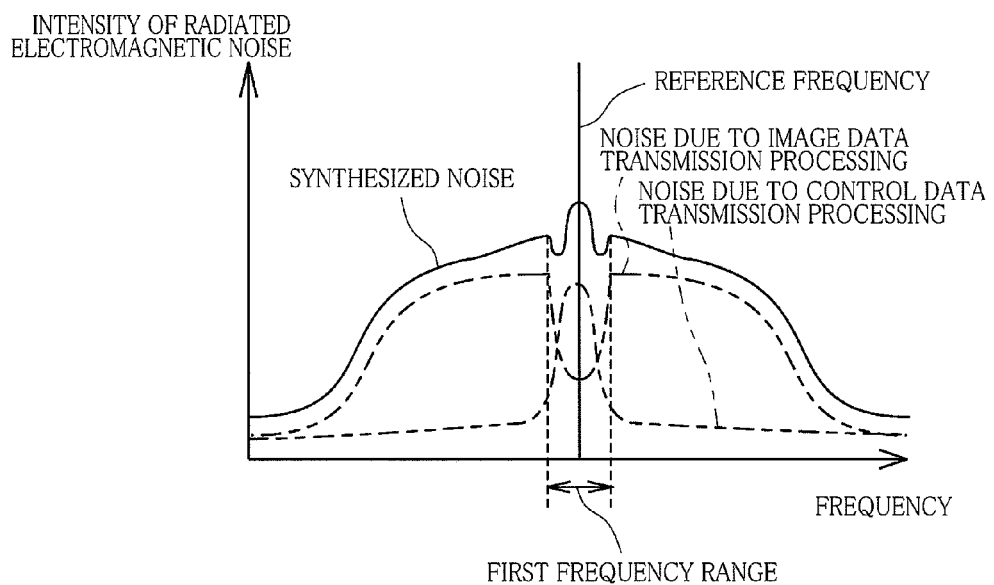
FIG. 6B is a view illustrating the intensity of radiated electromagnetic noise due to the image data transmission processing and a control data transmission processing.

In the control data transmission processing, the CPU 51 controls the second transmitter circuit 54 to transmit the control data stored in the control-data storage device 57, to the second receiver circuit 73 based on the second clock signal produced by the second clock signal generating circuit 82. Here, since the second clock signal has the reference frequency, radiated electromagnetic noise due to the control data transmission processing is large in a frequency range near the reference frequency. However, as described above, the peak of the radiated electromagnetic noise due to the image data transmission processing is reduced in the first frequency range. Accordingly, as illustrated in FIG. 6B, when compared with a case where the image data set is transmitted in the image data transmission processing also using the frequencies of the first frequency range, the peak of radiated electromagnetic noise in the first frequency range can be reduced for radiated electromagnetic noise obtained by synthesizing the radiated electromagnetic noise due to the image data transmission processing and the radiated electromagnetic noise due to the control data transmission processing, and in addition the peak of the synthesized radiated electromagnetic noise can also be reduced.

There will be next explained a reception processing and a restoration processing to be executed by the communication control circuit 75 of the ASIC 70 according to commands transmitted from the CPU 51.

The reception processing includes: an image data reception processing in which the CPU 51 controls the first receiver circuit 72 to receive the image data set transmitted from the main control circuit 50; and a control data reception processing in which the CPU 51 controls the second receiver circuit 73 to receive the control data transmitted from the main control circuit 50. In the image data reception processing, the communication control circuit 75 controls the first receiver circuit 72 to receive second divided pixel rows transmitted from the first transmitter circuit 53 through the first data communication line 91 based on the first clock signal produced by the first clock signal generating circuit 81 and controls the first receiver circuit 72 to receive the first divided pixel rows transmitted from the first transmitter circuit 53 through the second data communication line 92 based on the third clock signal generating circuit 83 produced by the third clock signal generating circuit 83. In the control data reception processing, the communication control circuit 75 controls the second receiver circuit 73 to receive the control data transmitted from the second transmitter circuit 54 through the third data communication line 93 based on the second clock signal produced by the second clock signal generating circuit 82.

In the restoration processing, the communication control circuit 75 sorts the divided pixel rows into the original arrangement order based on the headers respectively added to the first divided pixel rows and the second divided pixel rows received by the first receiver circuit 72 in the image data reception processing. The communication control circuit 75 then combines the divided pixel rows to restore the image data set.

Figure 7B:
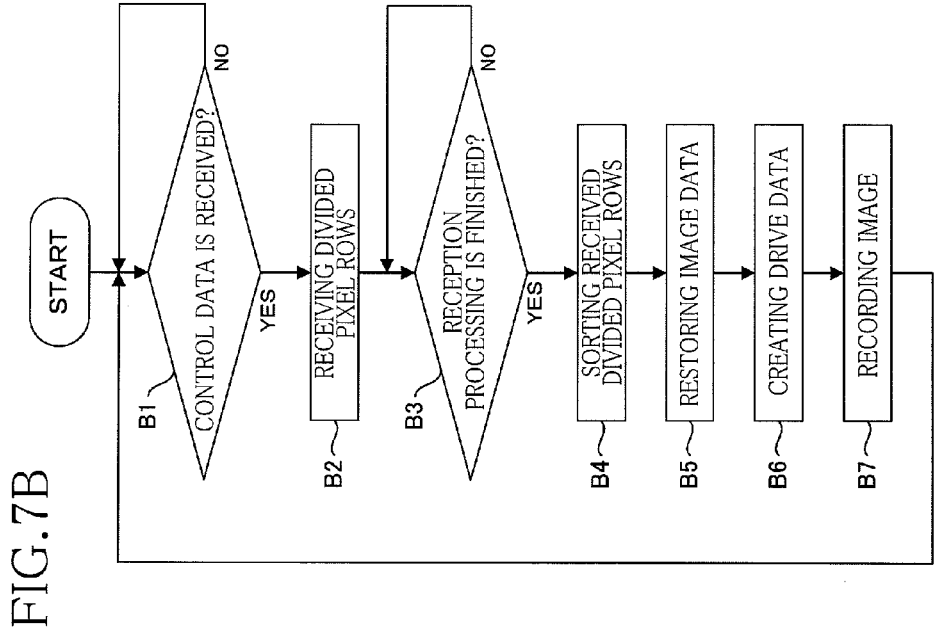
FIG. 7B is a flow chart illustrating processings to be executed by a recording control circuit.
Figure 7A:
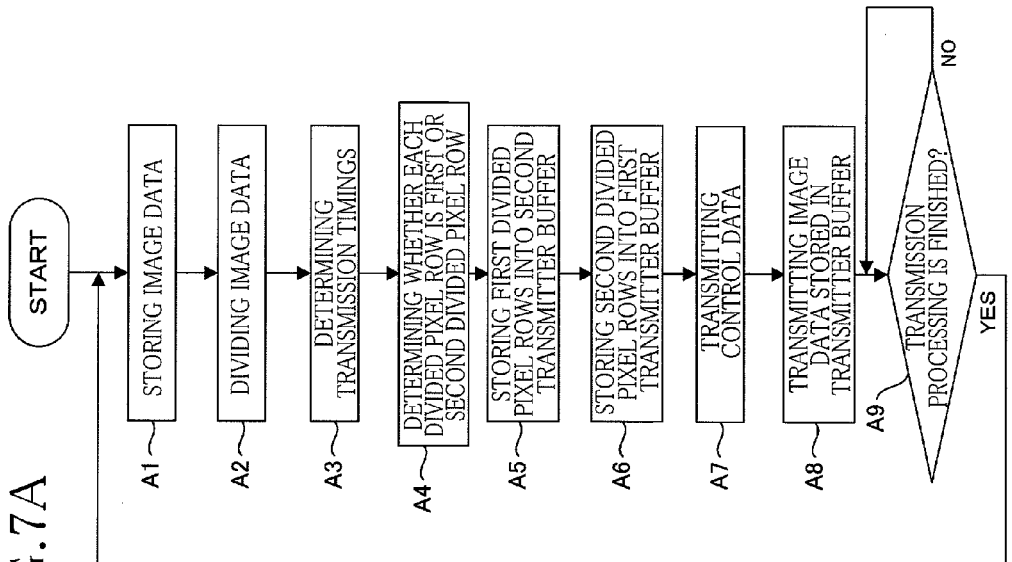
FIG. 7A is a flow chart illustrating processings to be executed by a CPU illustrated in FIG. 3.

There will be next explained processings to be executed by the CPU 51 of the main control circuit 50 in the present embodiment with reference to FIG. 7A. This flow begins with Step A1 (hereinafter abbreviated as "A1", the other steps being similarly abbreviated) at which when the image data set is received from the external device 150 via the communication interface 55, the CPU 51 stores the received image data set into the image-data storage device 56. The CPU 51 at A2 divides each raster data set contained in the image data set stored in the image-data storage device 56 into a plurality of divided pixel rows. The CPU 51 at A3 executes the transmission timing determination processing to determine timings of transmission of the respective divided pixel rows.

The CPU 51 at A4 executes the divided data set determination processing to determine whether each of the divided pixel rows is the first divided pixel row or the second divided pixel row. The CPU 51 at A5 stores the divided pixel rows each determined as the first divided pixel row in the divided data set determination processing, into the second transmitter buffer 53b and at A6 stores the divided pixel rows each determined as the second divided pixel row in the divided data set determination processing, into the first transmitter buffer 53a. The CPU 51 at A7 controls the second transmitter circuit 54 to transmit the control data for image recording stored in the control-data storage device 57, to the second receiver circuit 73 based on the second clock signal.

The CPU 51 at A8 controls the first transmitter circuit 53 to transmit the second divided pixel rows stored in the first transmitter buffer 53a, to the first receiver circuit 72 through the first data communication line 91 and to transmit the first divided pixel rows stored in the second transmitter buffer 53b, to the first receiver circuit 72 through the second data communication line 92. In this processing, the image processing circuit 85 executes the smoothing processing for the pixels of the boundary divided pixel rows. When the CPU 51 determines that the transmission processing at A8 is finished (A9: YES), this flow returns to A1.

There will be next explained processings to be executed by the recording control circuit 71 of the ASIC 70 in the present embodiment with reference to FIG. 7B. This flow begins with B1 at which the communication control circuit 75 determines whether the second receiver circuit 73 has received the control data relating to image recording from the main control circuit 50 or not. When the control data is received (B1: YES), the communication control circuit 75 at B2 controls the first receiver circuit 72 to receive the first divided pixel rows and the second divided pixel rows transmitted from the first transmitter circuit 53. When the reception processing at B2 is finished (B3: YES), the communication control circuit 75 at B4 sorts the received divided pixel rows based on the headers respectively added to the divided pixel rows received by the first receiver circuit 72. The communication control circuit 75 at B5 combines the sorted divided pixel rows to restore the image data set. The drive data generating circuit 76 at B6 quantizes the restored image data set to create drive data. At B7, the conveyance control circuit 77 controls the sheet-supply motor 6M, the conveyor motor 7M, and the conveyance motor 9M to convey the sheet P in the sheet conveying direction at the predetermined conveying speed, and the head control circuit 78 outputs the drive data produced by the drive data generating circuit 76, to the driver IC 47. As a result, an image is recorded on the sheet P based on the drive data. Upon completion of the processing at B7, this flow returns to B1.

In the present embodiment described above, the image data set is transmitted from the first transmitter circuit 53 to the first receiver circuit 72 based on the first clock signal obtained by modulating the reference clock signal, resulting in reduction in the peak of the radiated electromagnetic noise. In addition, the image data set is not transmitted from the first transmitter circuit 53 to the first receiver circuit 72 on the frequencies belonging to the first frequency range in the modulation frequency band of the first clock signal, resulting in further reduction in the peak of the radiated electromagnetic noise in the first frequency range.

In the present embodiment, the image data set is divided and transmitted from the first transmitter circuit 53 to the first receiver circuit 72, leading to efficient data transmission and reception. In each raster data set of the image data set, the first divided pixel rows are transmitted from the first transmitter circuit 53 to the first receiver circuit 72 through the second data communication line 92, and the second divided pixel rows are transmitted from the first transmitter circuit 53 to the first receiver circuit 72 through the first data communication line 91, thereby shortening a length of time required for transmission of the image data set when compared with a case where the image data set is transmitted using only a single data communication line. Also, the image processing circuit 85 executes the smoothing processing for the pixels of the boundary divided pixel rows which correspond to the ejection openings 30 belonging to the different head units 3x, resulting in reduction of an amount of lowering of the quality of the image formed on the sheet P.

Second Embodiment

There will be next explained a second embodiment of the present invention with reference to FIG. 8A. This second embodiment differs from the first embodiment in that the image data set stored in the image-data storage device 56 is transmitted from the first transmitter circuit 53 to the first receiver circuit 72 only through the first data communication line 91.

As illustrated in FIG. 8A, the CPU 51 controls the first transmitter circuit 53 to send the first receiver circuit 72 each divided pixel row determined as the second divided pixel row in the divided data set determination processing among the divided pixel rows obtained in the division processing, at the timing of transmission determined in the transmission timing determination processing. On the other hand, the CPU 51 controls the first transmitter circuit 53 to send the first receiver circuit 72 each divided pixel row determined as the first divided pixel row in the divided data set determination processing, at a timing different from the timing of transmission determined in the transmission timing determination processing, based on a frequency of the second frequency range of the first clock signal. In the present embodiment, the CPU 51 controls the first transmitter circuit 53 such that the first divided pixel rows are transmitted to the first receiver circuit 72 after the second divided pixel rows are transmitted to the first receiver circuit 72. As a modification, the CPU 51 may control the first transmitter circuit 53 to transmit the first divided pixel rows before transmitting the second divided pixel rows. As in the first embodiment, the communication control circuit 75 can restore the image data set by combining the divided pixel rows sorted in the original arrangement order based on the headers added to the respective divided pixel rows. The present embodiment described above can also reduce the peak of the radiated electromagnetic noise in the first frequency range.

Third Embodiment

There will be next explained a third embodiment of the present invention with reference to FIG. 8B. The third embodiment differs from the first embodiment in that the CPU 51 does not execute the transmission timing determination processing and the divided data set determination processing. In this embodiment, the image data set stored in the image-data storage device 56 is transmitted from the first transmitter circuit 53 to the first receiver circuit 72 only through the first data communication line 91.

As illustrated in FIG. 8B, the CPU 51 controls the first transmitter circuit 53 to transmit the divided pixel rows of each raster data set which are obtained in the division processing, to the first receiver circuit 72 in the arrangement order only based on the frequencies belonging to the second frequency range in the modulation frequency band of the first clock signal. The first receiver circuit 72 receives the divided pixel rows in the arrangement order. Accordingly, unlike the first embodiment, the communication control circuit 75 does not need to sort the received divided pixel rows and can restore the image data set by combining the divided pixel rows in the reception order. The present embodiment described above can also reduce the peak of the radiated electromagnetic noise in the first frequency range.

Fourth Embodiment

Figure 10:
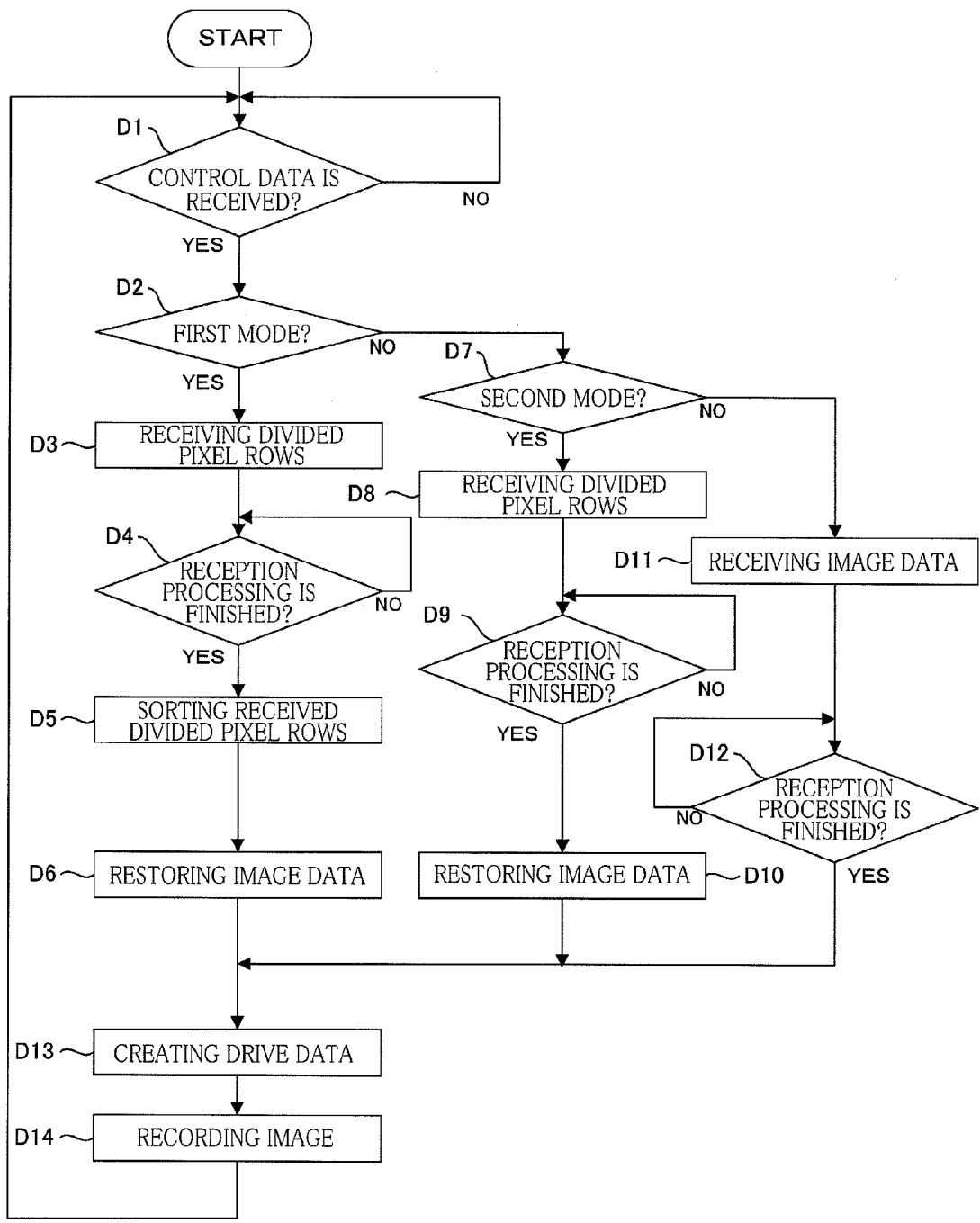
FIG. 10 is another flow chart illustrating processings to be executed by a recording control circuit in the fourth embodiment.

There will be next explained a fourth embodiment of the present invention with reference to FIGS. 9 and 10. In this fourth embodiment, the printer 1 has a plurality of transmission modes for transmission of the image data set from the first transmitter circuit 53 to the first receiver circuit 72. When executing the image data transmission processing, the CPU 51 selects one of the transmission modes.

In the present embodiment, the printer 1 has a first mode, a second mode, and a third mode as the transmission modes. The first mode is a transmission mode in which as in the first embodiment each raster data set of the image data set stored in the image-data storage device 56 is divided into a plurality of divided pixel rows, and the second divided pixel rows are transmitted from the first transmitter circuit 53 to the first receiver circuit 72 based on the first clock signal, while the first divided pixel rows are transmitted from the first transmitter circuit 53 to the first receiver circuit 72 based on the third clock signal. The second mode is a transmission mode in which as in the third embodiment each raster data set of the image data set stored in the image-data storage device 56 is divided into a plurality of divided pixel rows, and these divided pixel rows are transmitted from the first transmitter circuit 53 to the first receiver circuit 72 only based on the frequencies belonging to the second frequency range in the modulation frequency band of the first clock signal. The third mode is a transmission mode in which the image data set stored in the image-data storage device 56 is transmitted from the first transmitter circuit 53 to the first receiver circuit 72, without being divided, based on all the frequencies in the modulation frequency band of the first clock signal.

The CPU 51 selects the first mode in a case where there is a need to reduce the radiated electromagnetic noise in the first frequency range, and there is a need to shorten a length of time of transmission of the image data set. The CPU 51 selects the second mode in a case where there is a need to reduce the radiated electromagnetic noise in the first frequency range, and there is no need to shorten a length of time of transmission of the image data set. The CPU 51 selects the third mode in a case where the CPU 51 determines that there is no need to reduce the radiated electromagnetic noise in the first frequency range based on a state of data transmission and reception between transmit circuits and receiver circuits other than the first transmitter circuit 53 and the first receiver circuit 72.

There will be next explained processings to be executed by the CPU 51 of the main control circuit 50 in the present embodiment with reference to FIG. 9. This flow begins with C1 at which when the image data set is received from the external device 150 via the communication interface 55, the CPU 51 stores the received image data set into the image-data storage device 56. The CPU 51 at C2 selects one of the three transmission modes. When the CPU 51 selects the first mode as the transmission mode (C3: YES), this flow goes to C4. Processings at C4-C11 are generally similar to the above-described processings A2-A9, and an explanation of which is dispensed with. It is noted that mode information indicating that the transmission mode is the first mode is added to the control data transmitted from the second transmitter circuit 54 to the second receiver circuit 73 at C9. When the CPU 51 at C11 determines that the transmission processing is finished (C11: YES), this flow returns to C1.

When the CPU 51 at C3 does not select the first mode as the transmission mode (C3: NO) and selects the second mode (C12: YES), the CPU 51 at C13 divides each of the raster data sets contained in the image data set stored in the image-data storage device 56, into a plurality of divided pixel rows. The CPU 51 at C14 stores these divided pixel rows into the first transmitter buffer 53*a*. The CPU 51 at C15 controls the second transmitter circuit 54 to transmit the control data for image recording stored in the control-data storage device 57, to the second receiver circuit 73 based on the second clock signal. Mode information indicating that the transmission mode is the second mode is added to this control data. The CPU 51 at C16 controls the first transmitter circuit 53 to sequentially transmit the divided pixel rows stored in the first transmitter buffer 53*a*, to the first receiver circuit 72 through the first data communication line 91 only based on the frequencies belonging to the second frequency range in the modulation frequency band of the first clock signal. When the CPU 51 determines that the transmission processing at C16 is finished (C17: YES), this flow returns to C1.

When the CPU 51 does not select the second mode as the transmission mode (C12: NO) and selects the third mode, the CPU 51 at C18 stores the image data set stored in the image-data storage device 56, into the first transmitter buffer 53*a*. The CPU 51 at C19 controls the second transmitter circuit 54 to transmit the control data for image recording stored in the control-data storage device 57, to the second receiver circuit 73 based on the second clock signal. Mode information indicating that the transmission mode is the third mode is added to this control data. The CPU 51 at C20 controls the first transmitter circuit 53 to transmit the image data set stored in the first transmitter buffer 53*a*, to the first receiver circuit 72 through the first data communication line 91 based on all the frequencies in the modulation frequency band of the first clock signal. When the CPU 51 determines that the transmission processing at C20 is finished (C21: YES), this flow returns to C1.

There will be next explained processings to be executed by the recording control circuit 71 of the ASIC 70 in the present embodiment with reference to FIG. 10. This flow begins with D1 at which the communication control circuit 75 determines whether the second receiver circuit 73 has received the control data relating to image recording from the main control circuit 50 or not. When the control data is received (D1: YES) and when the mode information added to the control data indicates the first mode (D2: YES), this flow goes to D3. Processings at D3-D6 are generally similar to the above-described processings B2-B5, and an explanation of which is dispensed with. Upon completion of the processing at D6, this flow goes to D13.

When the mode information added to the received control data does not indicate the first mode (D2: NO) and indicates the second mode (D7: YES), the communication control circuit 75 at D8 controls the first receiver circuit 72 to receive the divided pixel rows transmitted from the first transmitter circuit 53. When the reception processing at D8 is finished (D9: YES), the communication control circuit 75 at D10 combines the received divided pixel rows to restore the image data set, and this flow goes to D13.

When the mode information added to the received control data does not indicate the second mode (D7: NO) and indicates the third mode, the communication control circuit 75 at D11 controls the first receiver circuit 72 to receive the image data set transmitted from the first transmitter circuit 53. When the reception processing at D11 is finished (D12: YES), this flow goes to D13. Processings at D13 and D14 are generally similar to the above-described processings B6 and B7, and an explanation of which is dispensed with.

In the present embodiment described above, the CPU 51 can select one of the transmission modes for the image data transmission processing according to a situation, allowing the printer 1 to execute the above-described processings with higher efficiency. As a modification, this printer may be configured such that a user can select one of the transmission modes.

While the embodiments of the present invention have been described above, it is to be understood that the invention is not limited to the details of the illustrated embodiments, but may be embodied with various changes and modifications, which may occur to those skilled in the art, without departing from the spirit and scope of the invention. For example, the first frequency range of the first clock signal includes the reference frequency in the above-described embodiments but may not include the reference frequency. The second clock signal produced by the second clock signal generating circuit 82 includes the reference frequency in the above-described embodiments but may include a frequency that is a multiple of the reference frequency. The frequency-range storage device 58 stores the first frequency range in the above-described embodiments but may store the second frequency range and may store both of the first frequency range and the second frequency range. Also, the printer may be configured such that the first frequency range to be stored into the frequency-range storage device 58 is set by the user.

The second clock signal produced by the second clock signal generating circuit 82 may have only the reference frequency. Also, the third clock signal produced by the third clock signal generating circuit 83 may have a frequency lower than the modulation frequency band of the first clock signal.

The printer may be configured such that the control data stored in the control-data storage device 57 is transmitted from the first transmitter circuit 53 to the first receiver circuit 72 through the second data communication line 92. Also, the printer may be configured such that the image processing circuit 85 can execute an image processing other than the smoothing processing for the pixels of the divided pixel rows transmitted through the second data communication line 92. Also, the CPU 51 may not execute the division processing in a case where an amount of data of the image data set is smaller than an amount of data which can be transmitted from the first transmitter circuit 53 to the first receiver circuit 72 based on the first clock signal within the period P (see FIG. 4A). Also, the printer may be configured such that the first transmitter circuit 53 and the first receiver circuit 72 are connected to each other only by the first data communication line 91 and such that the image data set transmitted from the main control circuit 50 to the ASIC 70 through the second data communication line 92 in the above-described embodiments is transmitted through the third data communication line 93. Also in this case, a smaller portion of the image data set is transmitted and received on the frequencies of the first frequency range, resulting in reduction in the peak of the radiated electromagnetic noise in the first frequency range.

The present invention is applicable to not only the line ink-jet printer but also a serial ink jet printer. The present invention is applicable to devices other than the printer such as various types of data transmitting and receiving devices each containing a transmitter and a receiver in a housing and configured to transmit and receive data between the transmitter and the receiver.

What is claimed is:

1. A data transmitting and receiving device, comprising:
a first communication data storage configured to store first communication data;
a first transmitter configured to transmit the first communication data;
a first receiver configured to receive the first communication data transmitted by the first transmitter;
a housing accommodating at least the first transmitter and the first receiver;
a transmission controller configured to control the first transmitter;
a reception controller configured to control the first receiver;
a first clock signal generator configured to modulate a reference clock signal comprising a reference frequency to produce a first clock signal comprising a frequency which changes in a set cycle within a set frequency band; and
a frequency range storage configured to store at least one of a first frequency range which is a part of the set frequency band of the first clock signal and a second frequency range which is a rest part of the set frequency band except for the first frequency range,
the transmission controller being configured to execute a transmission processing in which the transmission controller controls the first transmitter not to transmit the first communication data stored in the first communication data storage to the first receiver based on the first clock signal produced by the first clock signal generator and comprising the frequency belonging to the first frequency range of the set frequency band and controls the first transmitter to transmit the first communication data to the first receiver based on the first clock signal comprising the frequency belonging to the second frequency range of the set frequency band,
the reception controller being configured to execute a reception processing in which the reception controller controls the first receiver to receive the first communication data from the first transmitter based on the first clock signal comprising the frequency belonging to the second frequency range of the first clock signal.

2. The data transmitting and receiving device according to claim 1, further comprising:
a second communication data storage configured to store second communication data;
a second transmitter configured to transmit the second communication data;
a second receiver configured to receive the second communication data transmitted from the second transmitter; and
a second clock signal generator configured to produce a second clock signal comprising one of the reference frequency and a frequency that is a multiple of the reference frequency,
wherein the housing further accommodates the second transmitter and the second receiver,
wherein the first frequency range comprises the reference frequency,
wherein the transmission controller is configured to control the second transmitter to transmit the second communication data stored in the second communication data storage to the second receiver based on the second clock signal produced by the second clock signal generator, and
wherein the reception controller is configured to control the second receiver to receive the second communication data transmitted from the second transmitter, based on the second clock signal produced by the second clock signal generator.

3. The data transmitting and receiving device according to claim 1,
wherein the transmission controller is configured to execute:
a division processing in which the transmission controller divides the first communication data stored in the first communication data storage into a plurality of divided data sets; and
the transmission processing in which the transmission controller controls the first transmitter not to transmit the plurality of divided data sets to the first receiver based on the first clock signal comprising the frequency belonging to the first frequency range of the set frequency band and controls the first transmitter to transmit the plurality of divided data sets to the first receiver based on the first clock signal comprising the frequency belonging to the second frequency range of the set frequency band, and
wherein the reception controller is configured to execute:
the reception processing in which the reception controller controls the first receiver to receive the plurality of divided data sets based on the first clock signal comprising the frequency belonging to the second frequency range of the set frequency band; and
a restoration processing in which the reception controller restores the first communication data by combining the plurality of divided data sets received by the first receiver in the reception processing.

4. The data transmitting and receiving device according to claim 3,
wherein an amount of the first communication data stored in the first communication data storage is greater than an amount of data which the first transmitter is capable of transmitting to the first receiver based on the first clock signal during a period extending from a point in time when the frequency of the first clock signal changes from a first state to a second state, to a point in time when the frequency of the first clock signal changes from the second state to the first state, and wherein the first state is a state in which the frequency of the first clock signal is contained in the first frequency range, and the second state is a state in which the frequency of the first clock signal is contained in the second frequency range.

5. The data transmitting and receiving device according to claim 3, further comprising:

a first data communication line and a second data communication line each connecting the first transmitter and the first receiver communicably to each other; and a third clock signal generator configured to produce a third clock signal comprising a frequency which is less than the set frequency band of the first clock signal, wherein the transmission controller is configured to execute:

a transmission timing determination processing in which the transmission controller determines a timing of transmission for each of the plurality of divided data sets, assuming that the plurality of divided data sets are sequentially transmitted to the first receiver based on the frequency which changes in the set cycle within the set frequency band of the first clock signal; and a divided data set determination processing in which before the transmission processing the transmission controller determines, based on the timing of transmission determined in the transmission timing determination processing for each of the plurality of divided data sets, whether each of the plurality of divided data sets is a first divided data set to be transmitted on the frequency belonging to the first frequency range or a second divided data set to be transmitted on the frequency belonging to the second frequency range, wherein the transmission controller is configured to execute the transmission processing in which the transmission controller controls the first transmitter to transmit each of at least one divided data set of the plurality of divided data sets which is determined to be the second divided data set in the divided data set determination processing, to the first receiver via the first data communication line based on the first clock signal at a timing of transmission determined in the transmission timing determination processing for said each of the at least one divided data set determined to be the second divided data set and controls the first transmitter to transmit at least one divided data set of the plurality of divided data sets which is determined to be the first divided data set in the divided data set determination processing, to the first receiver via the second data communication line based on the third clock signal produced by the third clock signal generator, and wherein the reception controller is configured to execute:

the reception processing in which the reception controller controls the first receiver to receive the second divided data set transmitted by the first transmitter via the first data communication line, based on the first clock signal produced by the first clock signal generator and controls the first receiver to receive the first divided data set transmitted by the first transmitter via the second data communication line, based on the third clock signal produced by the third clock signal generator; and the restoration processing in which the reception controller restores the first communication data by combining the first divided data set and the second divided data set received by the first receiver.

6. The data transmitting and receiving device according to claim 3, wherein the transmission controller is configured to execute:

a transmission timing determination processing in which the transmission controller determines a timing of transmission for each of the plurality of divided data sets, assuming that the plurality of divided data sets are sequentially transmitted to the first receiver based on a frequency which changes in the set cycle within the set frequency band of the first clock signal; and a divided data set determination processing in which before the transmission processing the transmission controller determines, based on the timing of transmission determined in the transmission timing determination processing for each of the plurality of divided data sets, whether each of the plurality of divided data sets is a first divided data set to be transmitted on the frequency belonging to the first frequency range or a second divided data set to be transmitted on the frequency belonging to the second frequency range, wherein the transmission controller is configured to execute the transmission processing in which the transmission controller controls the first transmitter to transmit each of at least one divided data set of the plurality of divided data sets which is determined to be the second divided data set in the divided data set determination processing, to the first receiver based on the first clock signal at a timing of transmission determined in the transmission timing determination processing for said each of the at least one divided data set determined to be the second divided data set and controls the first transmitter to transmit at least one divided data set of the plurality of divided data sets which is determined to be the first divided data set in the divided data set determination processing, to the first receiver based on the frequency belonging to the second frequency range at a timing different from a timing of transmission determined in the transmission timing determination processing for said each of the at least one divided data set determined to be the first divided data set, and wherein the reception controller is configured to execute the restoration processing in which the reception controller restores the first communication data by combining the first divided data set and the second divided data set received by the first receiver.

7. The data transmitting and receiving device according to claim 3, wherein the transmission controller is configured to execute the transmission processing in which the transmission controller controls the first transmitter to sequentially transmit the plurality of divided data sets to the first receiver only based on the frequency belonging to the second frequency range in the set frequency band of the first clock signal, and wherein the reception controller is configured to execute the restoration processing in which the reception controller restores the first communication data by combining the plurality of divided data sets received by the first receiver.

8. A liquid ejection apparatus, comprising:
a liquid ejection head comprising a plurality of head units each formed with a plurality of ejection openings through which the liquid ejection head ejects liquid;
a moving mechanism configured to move the liquid ejection head and a recording medium relative to each other in a relative movement direction; and
the data transmitting and receiving device according to claim 1,
wherein the plurality of head units are arranged in a perpendicular direction perpendicular to the relative movement direction,
wherein the plurality of ejection openings of each of the plurality of head units are arranged in the perpendicular direction,
wherein the first communication data stored in the first communication data storage is image data comprising a plurality of pixel rows each constituted by a plurality of pixels respectively corresponding to the plurality of ejection openings of the plurality of head units, the plurality of pixel rows respectively correspond to a plurality of dot rows arranged in the relative movement direction on the recording medium, and the plurality of pixel rows are arranged in an order of arrangement of the plurality of dot rows each constituted by a plurality of dots arranged on the recording medium in the perpendicular direction, and
wherein the reception controller is configured to execute an image recording processing in which the reception controller controls the liquid ejection head and the moving mechanism such that an image is formed on the recording medium based on the image data received by the first receiver in the reception processing.

9. A liquid ejection apparatus, comprising:
a liquid ejection head comprising a plurality of head units each formed with a plurality of ejection openings through which the liquid ejection head ejects liquid;
a moving mechanism configured to move the liquid ejection head and a recording medium relative to each other in a relative movement direction; and
the data transmitting and receiving device according to claim 5,
wherein the plurality of head units are arranged in a perpendicular direction perpendicular to the relative movement direction,
wherein the plurality of ejection openings of each of the plurality of head units are arranged in the perpendicular direction,
wherein the first communication data stored in the first communication data storage is image data comprising a plurality of pixel rows each constituted by a plurality of pixels respectively corresponding to the plurality of ejection openings of the plurality of head units, the plurality of pixel rows respectively correspond to a plurality of dot rows arranged in the relative movement direction on the recording medium, and the plurality of pixel rows are arranged in an order of arrangement of the plurality of dot rows each constituted by a plurality of dots arranged on the recording medium in the perpendicular direction,
wherein the transmission controller is configured to execute the division processing in which the transmission controller divides each of the plurality of pixel rows of the image data into a plurality of divided pixel rows,
wherein the set cycle of the first clock signal is set such that the frequency of the first clock signal for at least one of the plurality of divided pixel rows belongs to the first frequency range, and the at least one of the plurality of divided pixel rows comprises two pixels respectively corresponding to two of the plurality of ejection openings, one of which belongs to one of the plurality of head units, another of which belongs to another of the plurality of head units, when the plurality of divided pixel rows are sequentially transmitted to the first receiver from a leading divided pixel row based on a frequency of the set frequency band of the first clock signal, and
wherein the reception controller is configured to execute an image recording processing in which the reception controller controls the liquid ejection head and the moving mechanism such that an image is formed on the recording medium based on the image data restored in the restoration processing.

10. The liquid ejection apparatus according to claim 9, further comprising a processor configured to execute a data processing for the plurality of divided data sets to be transmitted from the first transmitter to the first receiver,
wherein the processor is connected to the second data communication line and configured to execute an image processing for at least one pixel of the plurality of pixels which belongs to the divided pixel row to be transmitted from the first transmitter to the first receiver via the second data communication line.

11. A non-transitory storage medium storing a plurality of instructions executable by a processor of a data transmitting and receiving device,
the data transmitting and receiving device comprising: a communication data storage configured to store communication data; a transmitter configured to transmit the communication data; a receiver configured to receive the communication data transmitted by the transmitter; a housing accommodating at least the transmitter and the receiver; a clock signal generator configured to modulate a reference clock signal comprising a reference frequency to produce a clock signal comprising a frequency which changes in a set cycle within a set frequency band; and a frequency range storage configured to store at least one of a first frequency range which is a part of the set frequency band of the clock signal and a second frequency range which is a rest part of the set frequency band except for the first frequency range,
the plurality of instructions, when executed by the processor, causing the processor to execute:
a transmission processing in which the processor controls the transmitter not to transmit the communication data stored in the communication data storage to the receiver based on the clock signal produced by the clock signal generator and comprising the frequency belonging to the first frequency range of the set frequency band and controls the transmitter to transmit the communication data to the receiver based on the clock signal comprising the frequency belonging to the second frequency range of the set frequency band; and
a reception processing in which the processor controls the receiver to receive the communication data from the transmitter based on the clock signal comprising the frequency belonging to the second frequency range of the first clock signal.

12. A data transmitting and receiving device, comprising:
a first communication data storage configured to store first communication data;

a first transmitter configured to transmit the first communication data;

a first receiver configured to receive the first communication data transmitted by the first transmitter;

a housing accommodating at least the first transmitter and the first receiver;

a transmission controller configured to control the first transmitter;

a reception controller configured to control the first receiver;

a first clock signal generator configured to modulate a reference clock signal comprising a reference frequency to produce a first clock signal comprising a frequency which changes in a set cycle within a set frequency band; and a frequency range storage configured to store at least one of a first frequency range which is a part of the set frequency band of the first clock signal and a second frequency range which is a rest part of the set frequency band except for the first frequency range, the transmission controller being configured to:

determine the second frequency range based on at least one of the first frequency range and the second frequency range stored in the frequency range storage; and execute a transmission processing in which the transmission controller controls the first transmitter to transmit the first communication data to the first receiver based on the first clock signal comprising the frequency belonging to the determined second frequency range of the set frequency band, the reception controller being configured to execute a reception processing in which the reception controller controls the first receiver to receive the first communication data from the first transmitter based on the first clock signal comprising the frequency belonging to the second frequency range of the first clock signal.

* * * * *